United States Patent [19]
Becker et al.

[11] Patent Number: 5,382,985
[45] Date of Patent: Jan. 17, 1995

[54] THERMOREFRACTIVE OPTICAL SWITCH

[75] Inventors: Roger J. Becker, Kettering, Ohio; Mark K. Kullen, Detroit, Mich.

[73] Assignee: The United States of America as represented by the Secretary of the Air Force, Washington, D.C.

[21] Appl. No.: 720,575

[22] Filed: Jun. 14, 1991

[51] Int. Cl.⁶ .......................... G02B 5/23; G02B 5/20
[52] U.S. Cl. .................................. 359/289; 359/614; 385/5
[58] Field of Search ............... 359/288, 289, 298, 613, 359/614, 891; 385/5, 126; 362/318

[56] References Cited

U.S. PATENT DOCUMENTS

| | | | |
|---|---|---|---|
| 2,653,516 | 9/1953 | Johnson | 359/613 |
| 3,434,779 | 3/1969 | Damen et al. | 359/289 |
| 3,458,249 | 7/1969 | George | 359/614 |
| 3,751,658 | 8/1973 | Arnold | 359/614 |
| 4,114,985 | 9/1978 | Friedman | 359/289 |
| 4,307,942 | 12/1981 | Chahroudi | 359/298 |
| 4,342,821 | 8/1982 | Galves et al. | 359/614 |
| 4,536,061 | 8/1985 | Nishimura | 359/558 |
| 4,621,898 | 11/1986 | Cohen | 359/614 |
| 4,890,075 | 12/1989 | Pahlmann et al. | 359/891 |
| 5,020,884 | 6/1991 | Murphy | 359/886 |

OTHER PUBLICATIONS

Wohlers, M. R.; "Approximate Analysis . . . Absorbing Media"; Applied Optics, vol. 11, #6, Jun. 1972, pp. 1389–1398.

Primary Examiner—Nelson Moskowitz
Attorney, Agent, or Firm—Bobby D. Scearce; Samuel B. Smith, Jr.

[57] ABSTRACT

An optical switching device is described which comprises a substrate of light absorbent material, a plurality of holes defined through the substrate containing a liquid material having an index of refraction which is highly temperature dependent within a selected temperature range of operation, the liquid-filled holes defining a plurality of waveguides for conducting light through the substrate.

3 Claims, 1 Drawing Sheet

THERMOREFRACTIVE OPTICAL SWITCH

The invention described herein may be manufactured and used by or for the Government of the United States for all governmental purposes without the payment of any royalty.

BACKGROUND OF THE INVENTION

The present invention relates generally to optical switches, and more particularly to a thermorefractive optical switch utilizing temperature dependence of the refraction index of certain liquids to filter invasive radiation over a wide spectral band.

Prior art optical switches may generally be classified as mechanical, electromechanical, electro-optical, magneto-optical, and acousto-optical in principle of operation. These switches exhibit certain disadvantages for general application. For example, mechanical and electromechanical switches have moving parts and may have lower reliability of operation than the other types. Magneto-optic switches generally require an electromagnet for generating a magnetic field. Electro-optic switches require relatively high voltages for operation and may be polarization sensitive. Acousto-optic switches require a medium which supports the propagation of acoustic energy and usually are characterized by small permissible changes in refractive index.

The invention solves or substantially reduces in critical importance problems with prior art devices as just mentioned by providing a passive thermorefractive optical switching device comprising a substrate of light absorbent matrix material and includes an array of a plurality of holes filled with liquid having an index of refraction which is highly temperature dependent. Under normal operating conditions (i.e. to about 80° C.), a difference in refractive index between the liquid and the matrix material confines incident light to propagation along the waveguide defined by the liquid filled holes. As the temperature of the liquid is raised as by heating by incident light radiation or otherwise, the refractive index of the liquid decreases sufficiently, especially near boiling, to promote light leakage from the liquid to the matrix material.

The invention may find substantial utility for optical switching devices, as a spatial light modulator for use with incoherent light, as a remote temperature sensor or other optical switching application.

It is therefore a principal object of the invention to provide an improved optical switch.

It is a further object of the invention to provide a thermorefractive optical switch based on temperature dependence of the phase change of a liquid in conjunction with a structured matrix.

It is a further object of the invention to provide a passive optical switch for protecting sensitive optical systems from invasive light radiation.

These and other objects of the invention will become apparent as a detailed description of the representative embodiments proceeds.

SUMMARY OF THE INVENTION

In accordance with the foregoing principles and objects of the invention, an optical switching device is described which comprises a substrate of light absorbent material, a plurality of holes defined through the substrate containing a liquid material having an index of refraction which is highly temperature dependent within the selected temperature range of operation, the liquid-filled holes defining a plurality of waveguides for conducting light through the substrate.

DESCRIPTION OF THE DRAWINGS

The invention will be clearly understood from the following detailed description of representative embodiments thereof read in conjunction with the accompanying drawings wherein.

DETAILED DESCRIPTION

Figure 1:
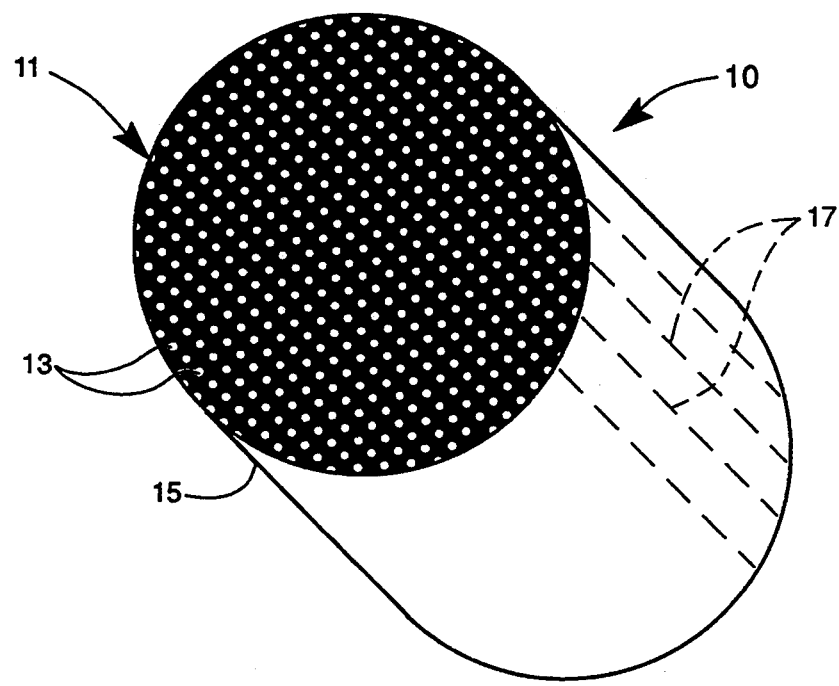
FIG. 1 is a schematic perspective view of an optical device according to the invention.

Referring now to the drawings, FIG. 1 shows in schematic perspective an optical device 10 of the invention. Device 10 comprises an array 11 of a plurality of closely packed waveguide elements 13 supported in a matrix 15 of material which is primarily light absorbent, and may be characterized by an index of refraction which is substantially insensitive to temperature over the intended temperature range of operation for device 10. As will be suggested below, device 10 may have an operating range of from sub-room temperature to about 200° C. depending on the particular application and corresponding selected materials of construction. Accordingly, matrix 15 material will preferably have a refractive index which changes less than about 1% over the operating range. Matrix 15 may ordinarily be disk-like in shape of thickness up to 2 cm and diameter of about 1 to 10 cm. Representative matrix 15 materials are presented in TABLE I along with the corresponding refractive indices.

Figure 2:
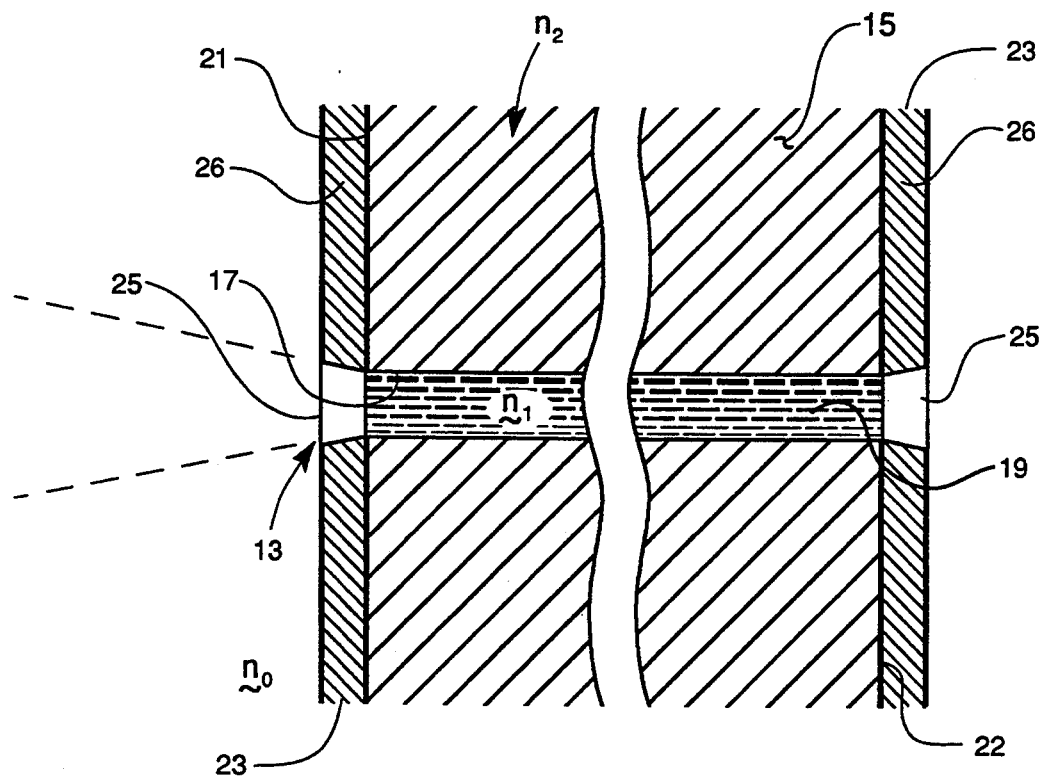
FIG. 2 shows a substantially enlarged cross-sectional view of one optical switch of which the FIG. 1 device is comprised.

A plurality of holes 17 are provided through the thickness of matrix 15 in any desired array in order to define the corresponding plurality of waveguides 13 for conducting light through matrix 15 in the operation of the invention as hereinafter detailed. One such waveguide 13 comprising an optical switch of the invention and of which array 11 of device 10 is comprised is shown in cross section in FIG. 2. Holes 17 are preferably sized in the range of about 6 to 50 micron second, although in some applications holes 17 may be larger or smaller than the stated range, the specific stated hole sizes not being considered limiting of the invention. Holes 17 may be drilled or bored using any suitable process as is well known in the art, including mechanical drilling, chemical etch, laser boring, or the like, depending on the thickness of matrix 15, a preferred method being chemical etch.

Each hole 17 is filled with a thermorefractive liquid 19 preferably having a refractive index which is highly temperature dependent (i.e., has a large dn/dT), the greatest effect being near the boiling point of liquid 19. The refractive index of liquids generally decreases with increased temperature, and for most liquids of interest, dn/dT is of the order of $10^{-3}$ to $10^{-4}$ per centigrade degree. Specific liquids 19 may be selected in consideration of specific heat, density, (preferably low) boiling point, non-corrosiveness (with matrix 15) and noxious properties, and transmissivity. Optical absorption of a selected liquid may be enhanced using a dopant such as a dye or carbon black of suitably small particle size. Candidate liquids 19 useful in the practice of the invention are presented in TABLE II along with the corresponding room temperature refractive indices and boiling points. The liquids listed in TABLE II are only representative of those usable in the invention, and other liquids or mixtures of those listed in TABLE II or others usable in given applications may occur to the skilled artisan guided by these teachings within the scope of the claims.

Each of the front surface 21 and the rear surface 22 of matrix 15 is covered by a film or layer 23 of material preferably similar to that of matrix 15 in order to seal liquid 19 within holes 17. Layers 23 may further have substantially transparent regions 25 defined between substantially opaque regions 26. Regions 25 are located in registration with holes 17 in order to admit light into each waveguide 13.

Each liquid 19 filled hole 17 in cooperation with the surrounding matrix 15 material defining each waveguide element 13 comprises an individual passive optical switch, the array 11 of a plurality of which defines optical switch 10. The refractive index of liquid 19 should be greater than that of matrix 15 so that waveguides 13 function as intended.

An optical device 10 built in demonstration of the invention comprised a Teflon TM matrix 15 with isopropyl alcohol as the liquid 19 in a single waveguide 13. The alcohol provided transparency for the device from the near infrared to the near ultraviolet. Optical switching was repeatedly demonstrated with rise times of about 100 microseconds, recovery times of less than 10 msec, an extinction factor of 20,000 and an (estimated) triggering threshold of about 100 micro-Joule.

It is noted that in the construction of device 10, the precision of drilling holes may be substantially affected by thickness of matrix 15. Accordingly, matrix 15 may be comprised of a layered assembly of thin sheets of material drilled with the desired array of holes 17 and bonded together with holes 17 in each layer in aligned relationship.

In the operation of device 10, light incident on the front surface 21 is conducted along waveguides 13 to a detector (not shown in the figures). The signal defined by the incident light may affect all or a portion of array 11, that is, device 10 may be configured to spatially modulate the incoming signal. If potentially destructive invasive radiation is incident on device 10, the liquid 19 contained in the affected (irradiated) waveguides 13 will change (decrease) in refractive index, which substantially reduces the light conducting capability of the affected waveguide(s) and results in dissipation of the invasive light energy into matrix 15. This switching function characteristic of device 10 will occur only over that portion of array 11 exposed to the invasive radiation. The passive operational characteristic of device 10 therefore precludes any need for external heating although externally applied electrical or thermal energy for supplementary operation of the device is envisioned for certain applications.

The invention therefore provides an improved optical device for optical switching or for spatially modulating a light beam. It is understood that modifications to the invention may be made as might occur to one skilled in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

TABLE I

| Candidate Matrix Materials | Refractive Index |
| --- | --- |
| Teflon | 1.35 |
| Fused Silica | 1.458 |
| Acetal Delrin | 1.48 |
| Methyl methacrylate | 1.48–1.50 |
| Polypropylene | 1.49 |
| Cellulose Acetate | 1.49–1.50 |
| Polyethylene | 1.50–1.54 |
| Borosilicate glass | 1.51 |
| Nylon | 1.53 |
| Soda Lead Glass | 1.55 |
| Polystyrene | 1.59–1.60 |
| Polycarbonate | 1.59 |
| Polyimide | 1.78 |

TABLE II

| Candidate Liquid | Refractive Index (RT) | Boiling Point °C. |
| --- | --- | --- |
| Methanol | 1.329 | 65 |
| Water | 1.33 | 100 |
| Ethanol | 1.359 | 78.5 |
| Isopropyl Alcohol | 1.38 | 82.4 |
| 1-Hexanol | 1.4182 | 157.5 |
| Toluene | 1.4969 | 110.6 |
| Dow Corning 702 | 1.51 | >200 |
| p-methoxybenzylidene-p'-butylaniline (MBBA) | 1.5496 | >200 |
| Carbon Disulfide | 1.62 | 46 |

We claim:

1. An optical device, comprising:
   (a) a substrate of substantially light absorbent material;
   (b) means defining a plurality of holes of preselected size through said substrate, said holes being defined in a selected array; and
   (c) a liquid material disposed within said holes, said liquid material having an index of refraction which is substantially temperature dependent over a selected temperature range of operation for said device.

2. The optical device of claim 1 wherein said substrate comprises a material selected from the group consisting of Teflon, fused silica, acetal delrin, methyl methacrylate, polypropylene, cellulose acetate, polyethylene, borosilicate glass, nylon, soda lead glass, polystyrene, polycarbonate, and polyimide.

3. The optical device of claim 1 wherein said liquid material is selected from the group consisting of methanol, water, ethanol, isopropyl alcohol, 1-hexanol, toluene, Dow Corning 702, p-methoxybenzylidene-p'-butylaniline, and carbon disulfide.

* * * * *